US009220017B2

United States Patent
Kobayashi et al.

(10) Patent No.: US 9,220,017 B2
(45) Date of Patent: Dec. 22, 2015

(54) RADIO PARAMETER CONTROL APPARATUS, BASE STATION APPARATUS, RADIO PARAMETER CONTROL METHOD, AND NON-TRANSITORY COMPUTER READABLE MEDIUM

(75) Inventors: Kosei Kobayashi, Tokyo (JP); Hiroto Sugahara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 226 days.

(21) Appl. No.: 13/991,737

(22) PCT Filed: Sep. 15, 2011

(86) PCT No.: PCT/JP2011/005205
§ 371 (c)(1),
(2), (4) Date: Jun. 5, 2013

(87) PCT Pub. No.: WO2012/081150
PCT Pub. Date: Jun. 21, 2012

(65) Prior Publication Data
US 2013/0252620 A1    Sep. 26, 2013

(30) Foreign Application Priority Data

Dec. 17, 2010    (JP) .................................. 2010-281430

(51) Int. Cl.
*H04W 16/18*    (2009.01)
*H04W 52/32*    (2009.01)
(Continued)

(52) U.S. Cl.
CPC ............. *H04W 16/18* (2013.01); *H04W 52/325* (2013.01); *H04W 16/10* (2013.01); *H04W 24/02* (2013.01); *H04W 24/10* (2013.01)

(58) Field of Classification Search
CPC ... H04W 24/02; H04W 72/082; H04W 24/10; H04W 72/08; H04W 16/10; H04W 52/243; H04W 52/244; H04W 84/045; H04W 16/18; H04W 28/08; H04W 52/0206; H04W 72/0486; H04W 16/08; H04W 52/143; H04W 52/24; H04W 52/241; H04W 52/283
See application file for complete search history.

(56) References Cited

U.S. PATENT DOCUMENTS 7,054,635 B1 *    5/2006   Ritzen et al. .................. 455/444
2010/0003995 A1*   1/2010   Ode .............................. 455/450
(Continued)

FOREIGN PATENT DOCUMENTS

CN    101690307 A    3/2010
JP    2009-290494 A    12/2009
(Continued)

OTHER PUBLICATIONS

International Search Report for PCT/JP2011/005205 dated Oct. 25, 2011.
(Continued)

*Primary Examiner* — Daniel Lai
(74) *Attorney, Agent, or Firm* — Sughrue Mion, PLLC

(57) ABSTRACT

A radio parameter control apparatus (1) includes a measurement report collection unit (10) and a radio parameter determination unit (11). The measurement report collection unit (10) collects a plurality of measurement reports generated by at least one mobile station (5), each of the measurement reports containing a measurement result of radio quality of a first cell (62) managed by a base station (4). The radio parameter determination unit (11) determines, based on the plurality of measurement reports so as to reduce the number of cell-edge mobile stations deemed to be located at a cell edge between the first cell (62) and a neighboring cell (61), an updated value of a radio parameter capable of changing coverage of the first cell (62).

22 Claims, 16 Drawing Sheets

(51) Int. Cl.
  *H04W 24/02* (2009.01)
  *H04W 16/10* (2009.01)
  *H04W 24/10* (2009.01)

(56) References Cited

U.S. PATENT DOCUMENTS

2010/0085884 A1* 4/2010 Srinivasan et al. ............ 370/252
2010/0311449 A1* 12/2010 Whinnett ...................... 455/501
2011/0039547 A1* 2/2011 van Rensburg et al. ...... 455/423
2011/0103339 A1* 5/2011 Kim et al. ..................... 370/329

FOREIGN PATENT DOCUMENTS

WO    03/036815 A1    5/2003
WO    2009/152978 A1  12/2009
WO    2010/128576 A1  11/2010

OTHER PUBLICATIONS

Communication dated Jul. 1, 2015 from the State Intellectual Property Office of the People's Republic of China in counterpart application No. 201180060747.0.

* cited by examiner

| | REPORTED RADIO QUALITY | CALCULATION CONDITIONS FOR PREDICTED VALUE OF NUMBER OF CELL EDGE UE ON PICO CELL SIDE |
|---|---|---|
| EXAMPLE 1 | RSRP OF PICO CELL (Ps[dBm])<br>RSRP OF NEIGHBORING CELL (Pn[dBm]) | $0 < Ps - Pn + D < TH1$ |
| EXAMPLE 2 | RSRP OF PICO CELL (Ps[dBm])<br>RSRQ OF PICO CELL (Qs[dB]) | PREDICTED VALUE ($Qs'$) OF $Qs$ AFTER CHANGE IN TRANSMISSION POWER $< TH2$ |
| EXAMPLE 3 | RSRP OF PICO CELL (Ps[dBm])<br>SINR OF PICO CELL (Rs[dB]) | PREDICTED VALUE ($Rs'$) OF $Rs$ AFTER CHANGE IN TRANSMISSION POWER $< TH3$ |
| EXAMPLE 4 | RSRP OF PICO CELL (Ps[dBm])<br>RSRQ OF PICO CELL (Qs[dB])<br>RSRP OF NEIGHBORING CELL (Pn[dBm]) | "FIRST CONDITION" AND "SECOND CONDITION" |
| EXAMPLE 5 | RSRP OF PICO CELL (Ps[dBm])<br>SINR OF PICO CELL (Rs[dB])<br>RSRP OF NEIGHBORING CELL (Pn[dBm]) | "FIRST CONDITION" AND "THIRD CONDITION" |

Fig. 9

| | REPORTED RADIO QUALITY | CALCULATION CONDITIONS FOR PREDICTED VALUE OF NUMBER OF CELL EDGE UE ON BOTH CELL SIDES |
|---|---|---|
| EXAMPLE 6 | RSRP OF PICO CELL (Ps[dBm])<br>RSRP OF NEIGHBORING CELL (Pn[dBm]) | $0 < \|Ps - Pn + D\| < TH1$ |
| EXAMPLE 7 | RSRP OF PICO CELL (Ps[dBm])<br>RSRQ OF PICO CELL (Qs[dB])<br>RSRP OF NEIGHBORING CELL (Pn[dBm])<br>RSRQ OF NEIGHBORING CELL (Qn[dB]) | $0 < \|Ps - Pn + D\| < TH1$<br>AND $\begin{cases} Qs' < TH2 & \text{(IF } Ps - Pn + D > 0\text{)} \\ Qn' < TH2 & \text{(ELSE)} \end{cases}$ |
| EXAMPLE 8 | RSRP OF PICO CELL (Ps[dBm])<br>SINR OF PICO CELL (Rs[dB])<br>RSRP OF NEIGHBORING CELL (Pn[dBm])<br>SINR OF NEIGHBORING CELL (Rn[dB]) | $0 < \|Ps - Pn + D\| < TH1$<br>AND $\begin{cases} Rs' < TH3 & \text{(IF } Ps - Pn + D > 0\text{)} \\ Rn' < TH3 & \text{(ELSE)} \end{cases}$ |

Fig. 10

RADIO PARAMETER CONTROL APPARATUS, BASE STATION APPARATUS, RADIO PARAMETER CONTROL METHOD, AND NON-TRANSITORY COMPUTER READABLE MEDIUM

CROSS REFERENCE TO RELATED APPLICATIONS

This application is a National Stage of International Application No. PCT/JP2011/005205 filed Sep. 15, 2011, claiming priority based on Japanese Patent Application No. 2010-281430 filed Dec. 17, 2010, the contents of all of which are incorporated herein by reference in their entirety.

TECHNICAL FIELD

The present invention relates to control of a radio parameter applied to a radio base station and, particularly, to control of a radio parameter that can change cell coverage.

BACKGROUND ART

In a cellular radio communication network such as a mobile phone network, a wide service area is formed by combining many small zones called cells. Those cells are generally managed by one radio base station in units of one to six cells. Further, the adjacent cells generally have an overlap in their coverage areas.

An operator of the radio communication network performs cell coverage design for providing high quality radio communication services to subscribers. In general, a drive test that makes measurements within an area with a vehicle equipped with a dedicated measurement device is conducted to make a survey on the place where the radio quality is not sufficient (coverage hole), the place where there is strong interference from many cells (pilot pollution) and the like. Then, the operator adjusts a radio parameter which can change cell coverage of a radio base station so as to solve the problems found in the survey. Examples of radio parameter which can change the cell coverage include transmission power of a pilot signal or a reference signal from a base station, and tilt angle of a base station antenna. Cell coverage varies depending on changes in the surrounding environment, such as installation of a new base station and construction of a building, for example. Therefore, the operator needs to perform coverage design on a regular basis even after a radio base station is installed. To reduce a cost of such coverage design, techniques to autonomously optimize cell coverage are proposed (for example, Patent Literatures 1 and 2).

According to the technique disclosed in Patent Literature 1, a control apparatus, placed in a network including a cell, collects measurement reports containing measurement results of radio quality of the cell (specifically, received power of a pilot signal that defines the cell coverage) from mobile stations and calculates proportion of the measurement reports indicating that the radio quality is equal to or less than a threshold. Then, the control apparatus adjusts the transmission power of the pilot signal so that the proportion becomes a specified value. For example, when the proportion of measurement reports where the radio quality is equal to or less than the threshold is relatively low as a result of summarizing measurement reports from mobile stations, the control apparatus determines that there is no sufficient overlap with neighboring cells and increases the transmission power of the pilot signal. On the contrary, when the proportion of measurement reports where the radio quality is equal to or less than the threshold is high, the control apparatus determines that there is excessive overlap with neighboring cells (i.e., interference is occurring) and decreases the transmission power of the pilot signal.

According to the technique disclosed in Patent Literature 2, a base station collects, from mobile stations, reports indicating the number of neighboring cells detected at cell edge of its cell, then the base station adjusts downlink transmission power of its cell so that the number of neighboring cells detected at the cell edge becomes three. Specifically, when the number of neighboring cells detected at the cell edge is two or less, the base station determines that there is no sufficient overlap between its cell and neighboring cells and increases the downlink transmission power. On the contrary, when the number of neighboring cells detected at the cell edge is four or more, the base station determines that there is excessive overlap between its cell and neighboring cells and decreases the downlink transmission power.

CITATION LIST

Patent Literature

PTL1: International Patent Publication No. WO 03/036815
PTL2: International Patent Publication No. WO 2009/152978

SUMMARY OF INVENTION

Technical Problem

The inventors of the present invention have found that use of the techniques disclosed in Patent Literatures 1 and 2 may cause an increase in the number of mobile stations that are located at cell edge (which are referred to hereinafter as cell-edge mobile stations or cell-edge UEs) by adjustment of cell coverage (i.e., adjustment of downlink transmission power). An increase in the number of cell-edge UEs is not desirable because radio quality is generally low at cell edge. For example, consider the case where the technique of Patent Literature 1 is applied to a cell having a mobile station distribution in which mobile stations are concentrated only near the center of the cell. In this case, the proportion of measurement reports indicating that radio quality is low is significantly small. Accordingly, adjustment is made to increase the downlink transmission power until the proportion of measurement reports indicating low radio quality reaches a specified value, and the cell coverage is thereby expanded. Thus, the number of cell-edge UEs with low radio quality increases as a result of the adjustment of the transmission power.

This problem is likely to occur particularly in the hierarchical cell environment where a small cell (micro cell, pico cell, femto cell etc.) that covers a local area is located within a macro cell that covers a wide area. In the hierarchical cell environment, overlap between the macro cell and the small cell is usually sufficiently large. However, in the techniques of Patent Literatures 1 and 2, when the proportion of measurement reports indicating that the radio quality is low in the small cell is small (or when the number of detected neighboring cells is small), it is determined that there is no sufficient overlap between the cells, which causes unnecessary quality degradation (increase in the cell edge UEs) by expansion of coverage of the small cell.

Based on the above issues, an object of the present invention is to provide a radio parameter control apparatus, a base station apparatus, a radio parameter control method and a program that can suppress an increase in the number of cell-edge UEs with low radio quality.

Solution to Problem

A first aspect of the present invention includes a radio parameter control apparatus. The radio parameter control apparatus includes a measurement report collection unit and a radio parameter determination unit. The measurement report collection unit collects a plurality of measurement reports generated by at least one mobile station. Each of the measurement reports contains a measurement result of radio quality of a first cell managed by a base station. The radio parameter determination unit determines, based on the plurality of measurement reports so as to reduce the number of cell-edge mobile stations deemed to be located at a cell edge between the first cell and a neighboring cell, an updated value of a radio parameter capable of changing coverage of the first cell. The updated value of the radio parameter may be a radio parameter value after update (i.e., absolute value) or a relative value indicating a variation in the radio parameter from before update.

A second aspect of the present invention includes a base station apparatus. The base station apparatus includes the radio parameter control apparatus according to the above-described first aspect of the present invention, and a radio communication unit that is configured to communicate with a mobile station and to be controlled based on the updated value.

A third aspect of the present invention includes a radio parameter control method. The method includes the following steps (a) and (b):

(a) collecting a plurality of measurement reports generated by at least one mobile station, each of the measurement reports containing a measurement result of radio quality of a first cell managed by a base station; and (b) determining, based on the plurality of measurement reports so as to reduce the number of cell-edge mobile stations deemed to be located at a cell edge between the first cell and a neighboring cell, an updated value of a radio parameter capable of changing a coverage of the first cell.

A fourth aspect of the present invention includes a computer program. The program is read into a computer and executed, thereby causing the computer to perform the radio parameter control method according to the above-described third aspect of the present invention.

Advantageous Effects of Invention

According to the aspects of the invention described above, it is possible to provide a radio parameter control apparatus, a base station apparatus, a radio parameter control method and a program that can suppress an increase in the number of cell-edge UEs with low radio quality.

BRIEF DESCRIPTION OF DRAWINGS

FIG. 9 is a table showing a specific example of conditions for calculating a predicted value of the number of cell-edge UEs;

FIG. 10 is a table showing a specific example of conditions for calculating a predicted value of the number of cell-edge UEs;

DESCRIPTION OF EMBODIMENTS

Specific embodiments of the present invention will be described hereinafter in detail with reference to the drawings. It is noted that in the description of the drawings, the same elements will be denoted by the same reference symbols and redundant description will be omitted.

First Embodiment

Figure 1:
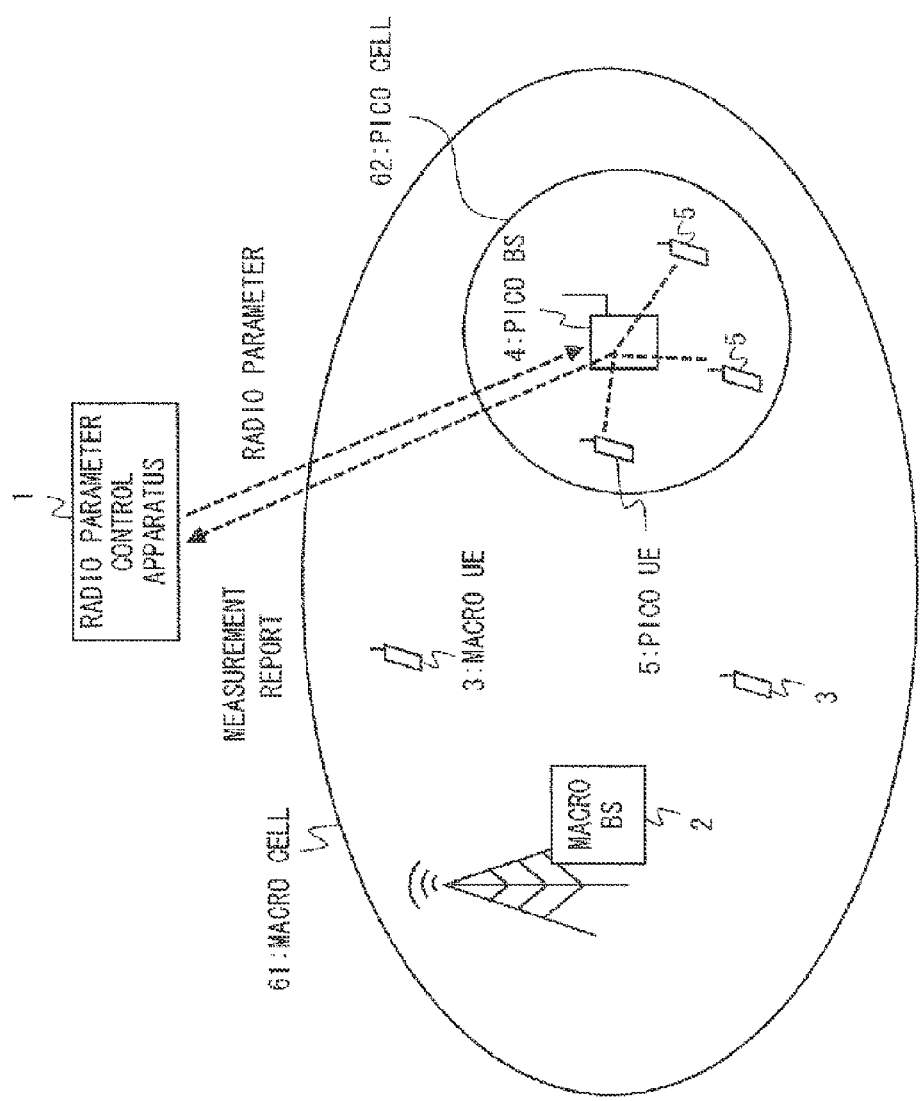
FIG. 1 is a diagram showing a configuration example of a network including a radio parameter control apparatus according to a first embodiment of the invention.

FIG. 1 is a diagram showing a configuration example of a network including a radio parameter control apparatus 1 according to this embodiment. A macro base station (macro BS) 2 form a macro cell 61 and performs bi-directional communication with a mobile station 3. Hereinafter, the mobile station 3 that connects to and communicates with the macro cell 61 is referred to as a macro mobile station (macro UE: User Equipment). The macro BS 2 is connected with an upper network (not shown) and relays traffic between the macro UE 3 and the upper network. The upper network includes a radio access network and a core network.

A pico base station (pico BS) 4 is located within the macro cell 61, forms a pico cell 62 that has a smaller cell size than the macro cell 61, and performs bi-directional communication with a mobile station 5. Hereinafter, the mobile station 5 that connects to and communicates with the pico cell 62 is referred to as a pico mobile station (pico UE). The pico BS 4 is connected with the upper network (not shown) and relays traffic between the pico UE 5 and the upper network. In the example of FIG. 1, the macro cell 61 and the pico cell 62 form a hierarchical cell structure. Specifically, the pico cell 62 is included in coverage of the macro cell 61.

The radio parameter control apparatus 1 acquires a plurality of measurement reports generated by at least one pico UE 5. The radio parameter control apparatus 1 may receive the measurement report via the pico BS 4. The measurement report contains measurement result of radio quality of the pico cell 62. Further, the measurement report may contain measurement result of radio quality of a neighboring cell (i.e., the macro cell 61 in the example of FIG. 1). A typical example of the radio quality of the cell measured by the pico UE 5 is received signal quality of a radio signal (downlink signal) transmitted from a base station. The received signal quality is, for example, received power or SINR (Signal to Noise Interference Ratio) of a pilot signal or a reference signal. In the case of W-CDMA, radio quality of a cell may be received power (CPICH RSCP: Received Signal Code Power) of a common pilot channel (CPICH: Common Pilot Channel) or Ec/No of CPICH. Further, in the case of LTE (Long Term Evolution), radio quality of a cell may be received power (RSRP: Reference Signal Received Power) or the received quality (RSRQ: Reference Signal Received Quality) of a downlink reference signal. Further, the pico UE 5 may measure an uplink or downlink throughput (data transfer rate) as radio quality of a cell and report measurement results of the throughput.

The radio parameter control apparatus 1 determines, based on a plurality of acquired measurement reports so as to reduce the number of cell-edge UEs deemed to be located at cell edge between an objective cell (pico cell 62) and a neighboring cell (macro cell 61), an updated value of a radio parameter which can change coverage of the pico cell 62. Then, the radio parameter control apparatus 1 applies the determined updated value to a radio communication unit of the pico BS 4 and thereby adjusts the coverage of the pico cell 62. Specific examples of the radio parameter which can change cell coverage are transmission power of a downlink signal (pilot signal, reference signal etc.) of the pico BS 4 and a tilt angle of an antenna of the pico BS 4. The updated value of a radio parameter may be a radio parameter value after update (i.e., absolute value) or a relative value indicating variation in the radio parameter from before update.

Alternatively, a cell individual power offset value (CIO: Cell Individual Offset) for the neighboring macro cell 61 may be used as the radio parameter which can change the cell coverage. In W-CDMA and LTE, A UE is notified of the CIO together with a list of measurement target cells from a base station. The CIO is a parameter related to handover, and it is used as an offset for received power of a neighboring cell when a UE triggers handover on the basis of a measurement value of the received power of the neighboring cell. As the CIO set from the objective cell (pico cell 62) to the neighboring cell (macro cell 61) is larger, handover from the objective cell (pico cell 62) to the neighboring cell (macro cell 61) is more likely to occur. Therefore, increasing the CIO for the neighboring cell (macro cell 61) has the same effect as reducing the coverage of the objective cell (pico cell 62). Further, CIO from the neighboring cell (macro cell 61) to the objective cell (pico cell 62) may be used as the radio parameter which can change the cell coverage. Setting a larger CIO for the objective cell (pico cell 62) causes handover from the neighboring cell (macro cell 61) to the objective cell (pico cell 62) to be more likely to occur and thus has the same effect as expanding the coverage of the objective cell (pico cell 62).

The radio parameter control apparatus 1 calculates, for example, the number of cell-edge UEs using a plurality of measurement reports. One sample of measurement report can be regarded as corresponding to one UE. Therefore, the radio parameter control apparatus 1 may estimate the number of cell-edge UEs, assuming the number of samples of measurement reports as the number of UEs. Note that, when estimating the number of cell-edge UEs, the radio parameter control apparatus 1 may count the exact number of samples (i.e., the exact number of UEs) excluding overlap of transmission source UEs, instead of simply counting the samples of measurement reports by allowing overlap of transmission source UEs. For example, ID for identifying UE (for example, CRNTI (Connection Radio Network Temporary Identifier), TMSI (Temporary Mobile Subscriber Identity), IMSI (International Mobile Subscriber Identity) etc.) is added to a measurement report, and the radio parameter control apparatus 1 specifies a transmission source UE from the ID contained in the measurement report. Alternatively, overlap of transmission source UEs may be eliminated by limiting the number of times of sending a measurement report from each UE during a measurement report collection period of the radio parameter control apparatus 1 to one, for example.

As described above, the radio parameter control apparatus 1 according to this embodiment refers to a plurality of measurement reports generated by UE (the pico UE 5 or the macro UE 3) and determines the updated value of the radio parameter which can change the coverage of the pico cell 62 so that the number of cell-edge UEs deemed to be located at the cell edge between the pico cell 62 and the macro cell 61 is reduced. In other words, the radio parameter control apparatus 1 adjusts the radio parameter related to the pico cell 62 so that the cell edge is at a place with few UEs. Therefore, according to this embodiment, it is possible to suppress an increase in the number of cell-edge UEs with low radio quality.

Figure 2:
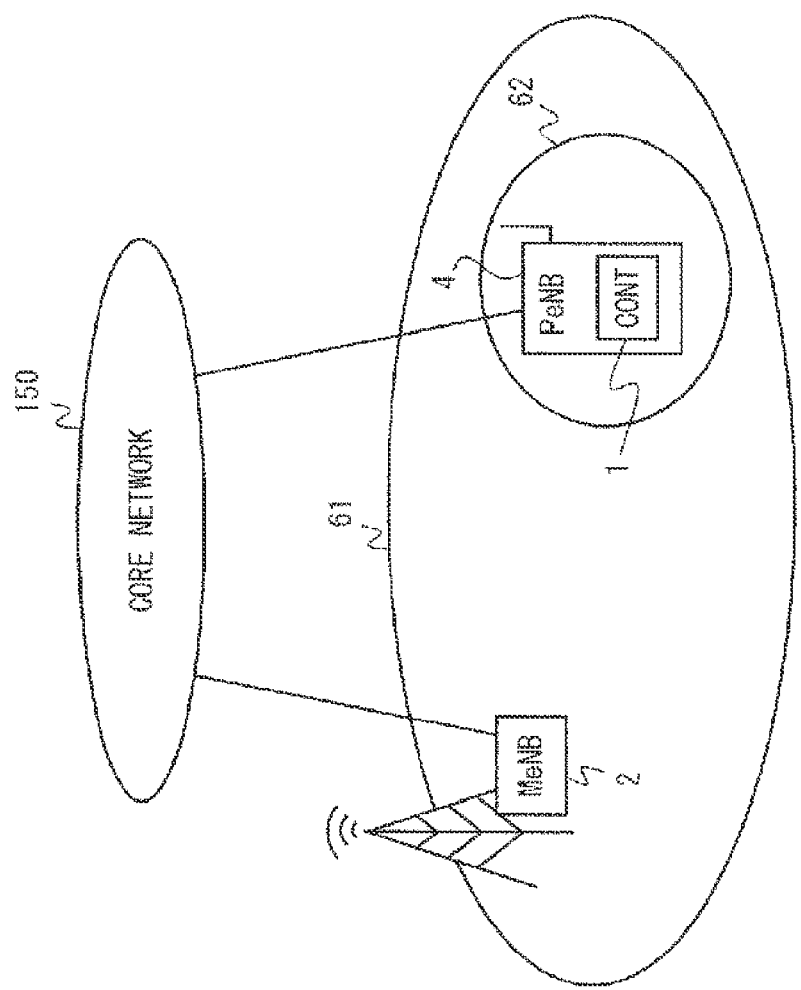
FIG. 2 is a diagram showing a configuration example of a network including the radio parameter control apparatus according to the first embodiment of the invention.

The placement of the radio parameter control apparatus 1 is appropriately decided on the basis of network architecture design concept. For example, in the case where the mobile communication system according to this embodiment is EPS (Evolved Packet System), the functions of the radio parameter control apparatus 1 may be implemented in the pico BS (pico eNB (PeNB)) 4 having the radio resource management function as shown in FIG. 2, not implemented in the core network 150.

Figure 3:
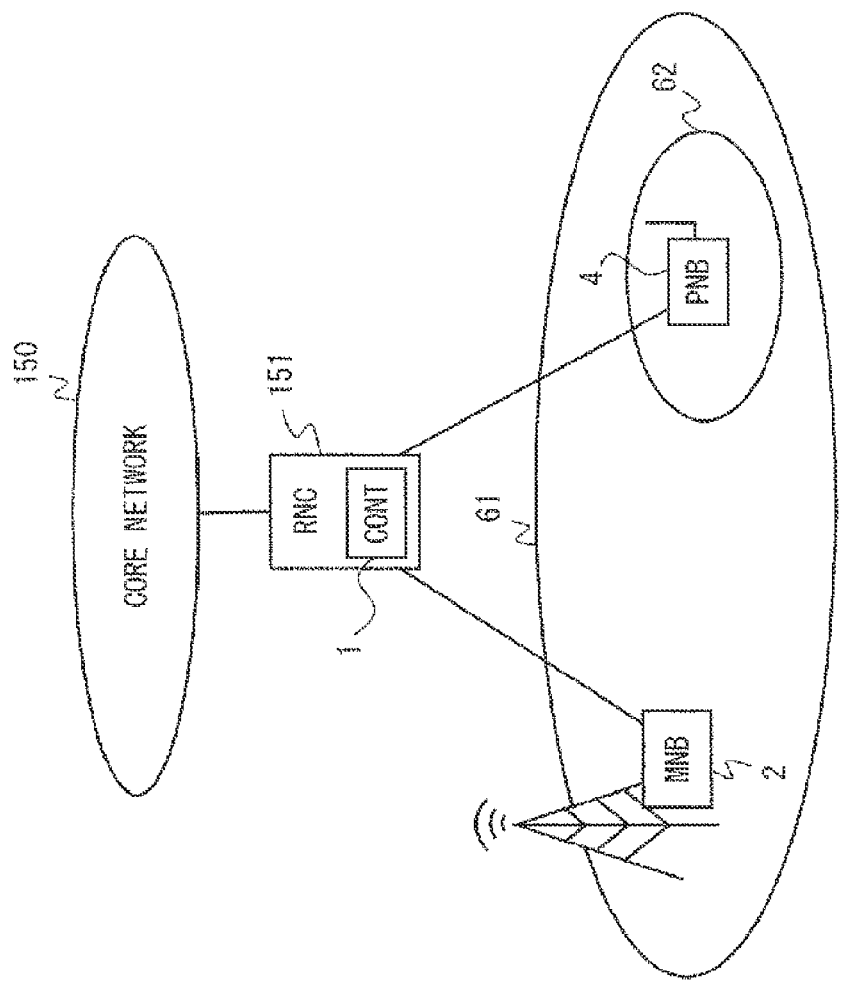
FIG. 3 is a diagram showing a configuration example of a network including the radio parameter control apparatus according to the first embodiment of the invention.

On the other hand, in the case where the mobile communication system according to this embodiment is UMTS (Universal Mobile Telecommunications System), the functions of the radio parameter control apparatus 1 may be implemented in a RNC (Radio Network Controller) 151 as shown in FIG. 3. In the example of FIG. 2, the RNC 151 manages radio resources of the macro cell 61 and the pico cell 62 and controls inter-cell mobility of the macro UE 3 and the pico UE 5.

Figure 4:
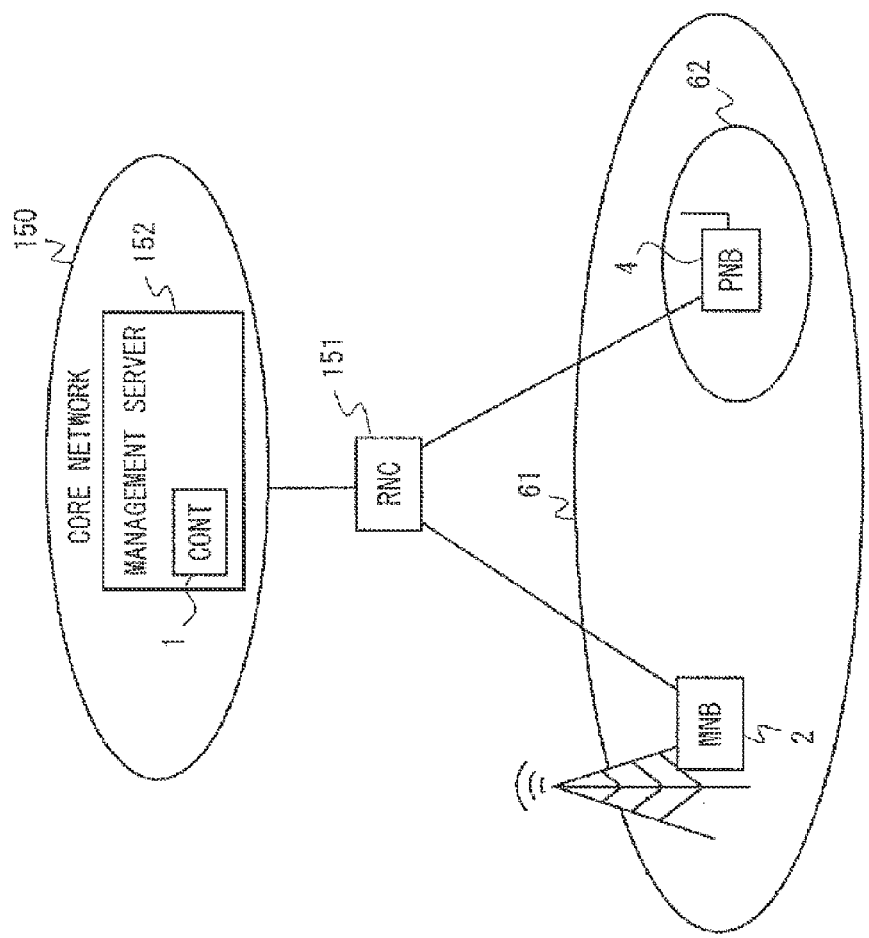
FIG. 4 is a diagram showing a configuration example of a network including the radio parameter control apparatus according to the first embodiment of the invention.

Alternatively, as shown in FIG. 4, the functions of the radio parameter control apparatus 1 may be implemented in a management server 152 in the core network 150. Although FIG. 4 shows the case of UMTS, this is the same for the case of other mobile communication systems such as EPS.

Furthermore, the functions of the radio parameter control apparatus 1 may be implemented separately in the mobile communication system. For example, in the example of FIG. 4, the functions of accruing measurement reports, determining and adjusting a radio parameter may be implemented in the RNC 151, and the functions of analyzing the distribution of radio quality of the pico cell 62 (i.e., calculating the number of cell-edge UEs) may be implemented in the management server 152.

Figure 5:
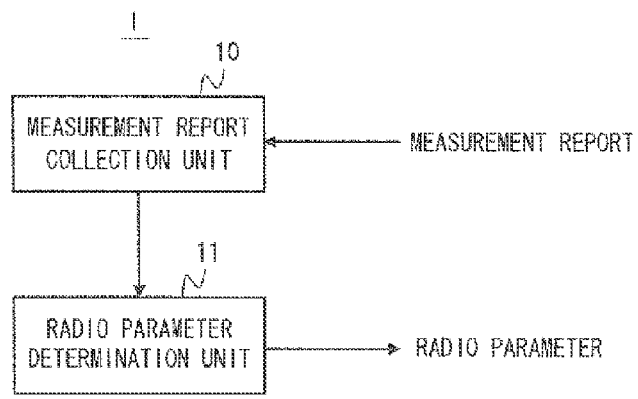
FIG. 5 is a block diagram showing a configuration example of the radio parameter control apparatus shown in FIG. 1.

A specific example of a configuration and a radio parameter determination operation of the radio parameter control apparatus 1 are described hereinafter in detail. FIG. 5 is a block diagram showing a configuration example of the radio parameter control apparatus 1. A measurement report collection unit 10 acquires a plurality of measurement reports generated by at least one pico UE 5. The measurement report collection unit 10 may collect measurement reports from a plurality of pico UEs 5. Alternatively, the measurement report collection unit 10 may acquire measurement reports generated by the macro UE 3 in addition to the pico UE 5. The measurement reports acquired by the measurement report collection unit 10 at least contain a measurement result of radio quality of the pico cell 62. The measurement reports may contain a measurement result of radio quality of the neighboring macro cell 61.

In the case of acquiring a plurality of measurement reports from a plurality of UEs, the measurement report collection unit 10 preferably collects measurement results by the respective UEs within the same period of time. By collecting the radio quality measured by the pico UEs 5 in the same period, a snapshot of the location of UEs during that period can be obtained. In the case where the number of pico UEs 5 is small, such as the case of acquiring a plurality of measurement reports from one pico UE 5 only, the measurement report collection unit 10 may collect a plurality of measurement results obtained at different times and in different places.

The radio parameter determination unit 11 refers to a plurality of measurement reports and calculates the current value of the number of cell-edge UEs based on the distribution of radio quality of the pico cell 62. Then the radio parameter determination unit 11 determines the updated value of the radio parameter so as to reduce the current value of the number of cell-edge UEs. The following description is based on the assumption that the radio parameter is transmission power (i.e., transmission power of a pilot signal or a reference signal) of the pico BS 4. The radio parameter determination unit 11 adjusts the transmission power of the pico BS 4 by the updated value of the radio parameter (the transmission power of the pico BS 4).

Figure 6:
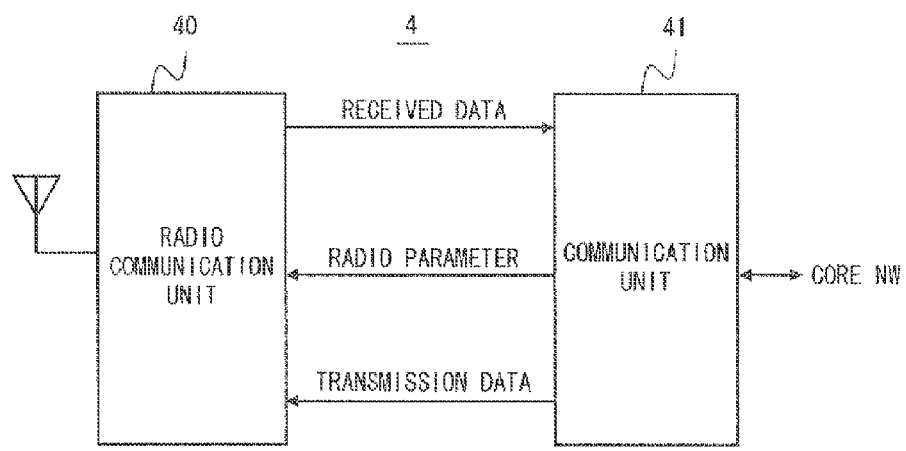
FIG. 6 is a block diagram showing a configuration example of a pico base station shown in FIG. 1.

FIG. 6 is a block diagram showing a configuration example of the pico BS 4. In FIG. 6, a radio communication unit 40 performs bi-directional communication with the pico UE 5. The radio communication unit 40 transmits a downlink radio signal containing encoded control data and user data to the pico UE 5. Further, the radio communication unit 40 receives an uplink radio signal transmitted from the pico UE 5 and decodes received data from the uplink radio signal.

A communication unit 41 transmits and receives data to and from an upper network such as the core network 150. The communication unit 41 may support an inter-base-station interface (e.g., LTE X2 interface) and transmit and receive information to and from another base station.

The measurement report contained in the received data from the pico UE 5 is send to the radio parameter control apparatus 1. When the radio parameter control apparatus 1 is located outside the pico BS 4, the radio parameter control apparatus 1 may receive the measurement report through the communication unit 41 and control the radio parameter (which is the transmission power in this example) of the radio communication unit 40 through the communication unit 41. When, on the other hand, the radio parameter control apparatus 1 is located integrally with the pico BS 4, the radio parameter control apparatus 1 may acquire the measurement report from the received data decoded by the radio communication unit 40 and directly control the transmission power of the radio communication unit 40. The pico UE 5 may be previously notified of measurement conditions for radio quality of the cell and report conditions for measurement reports from the radio parameter control apparatus 1, the pico BS 4 or a apparatus in the upper network. The measurement conditions for radio quality are, for example, a measurement cycle, a trigger condition for measurement (at the start of communication, for example), a measurement time, a measurement period, radio quality of a measurement target, a measurement target cell (a cell to be measured) and the like. The report conditions for measurement reports are, for example, a report cycle, a trigger condition for report (at the start of communication or after handover, for example), a report time, radio quality of a report target, a report target cell (a cell to be reported) and the like.

Several specific examples of a process of determining a radio parameter updated value by the radio parameter control apparatus 1 according to this embodiment are described hereinafter.

First Specific Example

In the first specific example, the radio parameter control apparatus 1 determines the updated value of a radio parameter so that a position in which the number of samples of radio quality of the pico cell 62 (i.e., the number of reports from UE) is smaller than the current value in the distribution of radio quality of the pico cell 62, which is obtained using a plurality of measurement reports, becomes the cell edge. To be more specific, the radio parameter control apparatus 1 calculates the current value of the number of cell-edge UEs and the predicated value of the number of cell-edge UEs by assuming that the transmission power of the pico BS 4 is changed, using measurement reports from the pico UE 5, without using measurement reports from the macro UE 3. Then, the radio parameter control apparatus 1 determines, as the updated value of the radio parameter, a value of the radio parameter (i.e., the transmission power of the pico BS 4 in this example) that gives a predicated value of the number of cell-edge UEs which is smaller than the current value of the number of cell-edge UEs.

Figure 7:
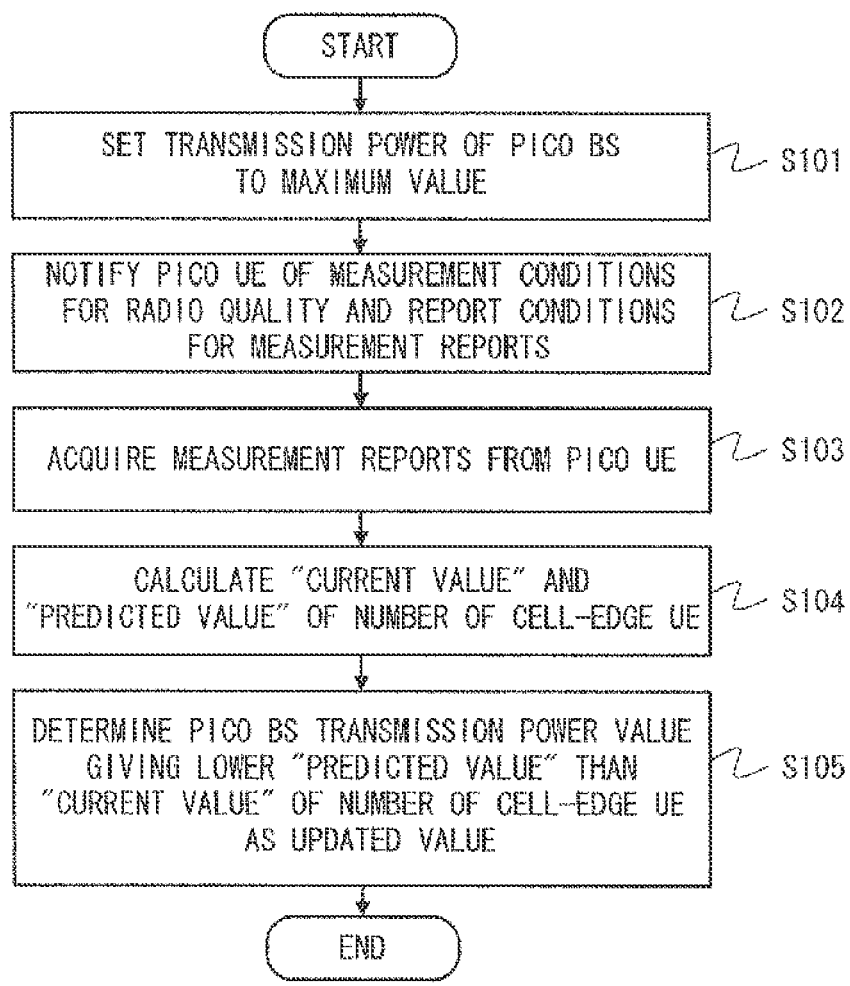
FIG. 7 is a flowchart showing a first specific example of a radio parameter determination process by the radio parameter control apparatus shown in FIG. 1.

FIG. 7 is a flowchart showing the first specific example. In Step S101, the radio parameter determination unit 11 of the radio parameter control apparatus 1 sets the transmission power of the pico BS 4 to the maximum value within the allowable range. In Step S102, the measurement report collection unit 10 notifies the pico UE 5 of measurement conditions for radio quality and report conditions for measurement reports through the pico BS 4. Further, the measurement report collection unit 10 may notify the macro UE 3 of measurement conditions for radio quality and report conditions for measurement reports, expecting that the macro UE 3 moves into the pico cell 62 and becomes the pico UE 5. In this case, after the macro UE 3 moves into the pico cell 62 and becomes the pico UE 5, the macro UE 3 may perform measurement and report of radio quality as the pico UE 5 based on the measurement conditions for radio quality and the report conditions for measurement reports received when it has been the macro UE 3. Note that Steps S101 and S102 may be performed by another apparatus (for example, the pico BS 4) different from the radio parameter control apparatus 1. In Step S103, the measurement report collection unit 10 receives a plurality of measurement reports generated by the pico UE 5 via the pico BS 4. The measurement report collection unit 10 may continue to collect measurement reports until it reaches a specified number of samples (a specified number of reports) or may collect measurement reports during a specified period of time. In Step S104, the radio parameter determination unit 11 in the radio parameter control apparatus 1 calculates the current value and the predicted value of the number of cell-edge UEs using the plurality of measurement reports. A specific example of a method of calculating the current value and the predicted value of the number of cell-edge UEs is described later. In Step S105, the radio parameter determination unit 11 determines, as the updated value, the transmission power value of the pico BS 4 that gives the predicted value of the number of cell-edge UEs which is smaller than the current value of the number of cell-edge UEs. Although the initial value of the transmission power is set to the maximum value in Step S101 of FIG. 7, any transmission power different from the maximum value may be set as the initial value.

Next, a specific example of a method of calculating the current value of the number of cell-edge UEs and the predicted value of the number of cell-edge UEs assuming the transmission power of the pico BS 4 is changed is described. The term "cell edge (which can be also referred to as a cell boundary or a cell border)" in this specification indicates a region which is far from a base station (for example, the pico BS 4) and in which radio quality is degraded, or a border region between cells. Thus, a region in which radio quality of an objective cell (pico cell 62) is a specified value or less, or a region in which a difference in radio quality between the objective cell (pico cell 62) and a neighboring cell (macro cell 61) is a specified threshold or less can be regarded as "cell edge".

Figure 8A:
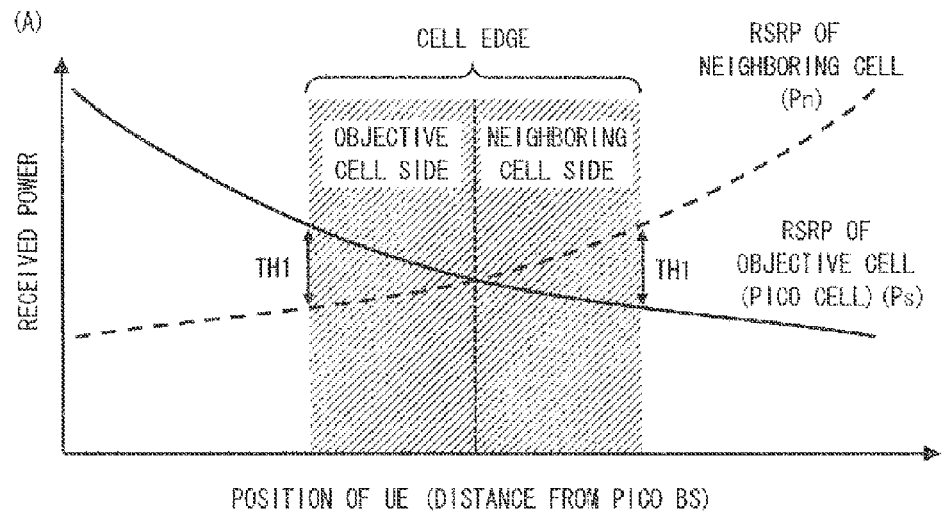
FIG. 8A is a graph showing an example of a relationship between a pico cell received power and a neighboring cell received power at mobile station positions.

FIG. 8A is a graph showing an example of a relationship between RSRP (Ps) of the pico cell 62 and RSRP (Pn) of the neighboring cell (macro cell 61). Note that RSRP is a term for LTE and indicates received power of a reference signal transmitted from a base station. As shown in FIG. 8A, the region in which a difference between Ps and Pn is equal to or less than a specified threshold TH1 may be defined as the cell edge. When such definition is made, the "cell edge" includes both a cell edge on the objective cell side (i.e., on the pico cell 62 side) and a cell edge on the neighboring cell side (i.e., on the macro cell 61 side) as shown in FIG. 8A.

Figure 8B:
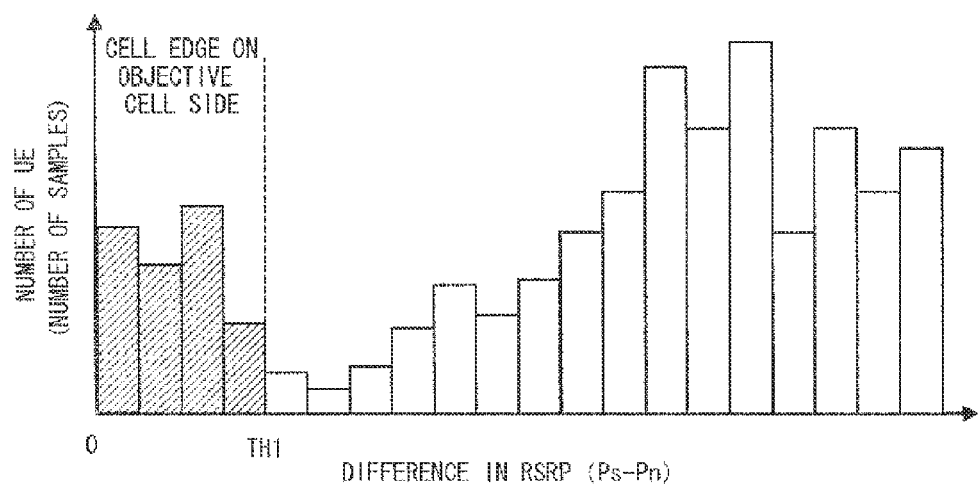
FIG. 8B is a histogram showing an example of distribution of a difference in RSRP based on measurement reports.

FIG. 8B is a histogram showing a frequency distribution of radio quality (i.e., a difference in RSRP) obtained by calculating a difference in RSRP between the RSRP of the pico cell 62 and the RSRP of the macro cell 61, i.e., (Ps−Pn), for each of a plurality of measurement report samples collected from the UE. When using the definition of FIG. 8A, by counting the number of samples where a difference in RSRP (i.e., Ps−Pn) is 0 or more and the threshold TH1 or less, which is the number of samples in the hatched range of FIG. 8B, the "current value" of the number of cell-edge UEs on the objective cell (pico cell 62) side can be estimated.

Further, by using the histogram of FIG. 8B, the "predicted value" of the number of cell-edge UEs on the objective cell (pico cell 62) side can be estimated. Assuming the transmission power of a reference signal by the pico BS 4 increases, the value of Ps becomes larger by the amount of the increase in transmission power. Thus, it is assumed that the entire histogram of FIG. 8B shifts to the right by the amount of the increase in transmission power. On the contrary, when the transmission power of a reference signal by the pico BS 4 decreases, it is assumed that the entire histogram of FIG. 8B shifts to the left by the amount of the decrease in transmission power. Therefore, the "predicted value" of the number of cell-edge UEs on the objective cell side can be estimated by counting the number of samples where a difference in RSRP (i.e., Ps−Pn) is 0 or more and the threshold TH1 or less when it is assumed that the transmission power of the pico BS 4 is changed.

Figure 8C:
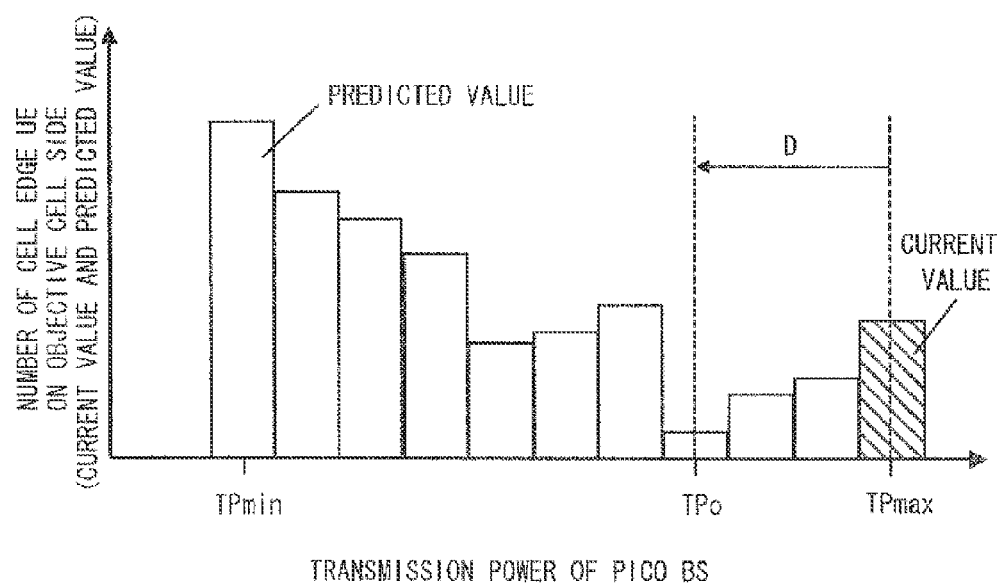
FIG. 8C is a histogram showing an example of a current value and a predicted value of the number of cell-edge UEs.

FIG. 8C is a histogram showing a result of estimation of the "current value" and the "predicted value" of the number of cell-edge UEs on the objective cell (pico cell 62) side. The horizontal axis of FIG. 8C is the transmission power of the pico BS 4, which is the radio parameter. In the case where radio quality measurement is performed by setting the transmission power to the maximum value, as in the process shown in FIG. 7, the estimation result for the maximum value of the transmission power (TPmax) corresponds to the "current value", and the other estimation results correspond to the "predicted value". For example, the radio parameter control apparatus 1 may set, as the "updated value" of the radio parameter, the pico BS transmission power (TPo) that gives the smallest value among the current value and the predicted values of the number of cell-edge UEs on the objective cell side. By selecting the smallest value, the number of cell-edge UEs may be reduced most effectively. However, the radio parameter control apparatus 1 does not necessarily select the transmission power that gives the smallest value as the updated value. Thus, the radio parameter control apparatus 1 may set, as the updated value of the radio parameter, an arbitrary transmission power that gives a smaller predicted value than the current value of the number of cell-edge UEs on the objective cell side.

In the above description with reference to FIGS. 8A, 8B and 8C, the case of using RSRP as the radio quality and estimating the number of cell-edge UEs on the objective cell (pico cell 62) side as the number of cell-edge UEs is described. However, as shown in the table of FIG. 9, other quality indexes different from RSRP may be used as the radio quality. Further, as shown in the table of FIG. 10, the number of cell-edge UEs on the both cell sides that further includes the neighboring cell side may be estimated as the number of cell-edge UEs.

FIG. 9 shows five examples of calculation conditions for a predicted value of the number of cell-edge UEs on the objective cell (pico cell 62) side. The example 1 of FIG. 9 shows conditions using a difference in RSRP, which corresponds to the specific example described using FIGS. 8A, 8B and 8C. Thus, in the example 1 of FIG. 9, total number of measurement report samples that satisfy the conditions of the following expression (1) is used as the predicted value of the number of cell-edge UEs. In the expression (1), D[dB] indicates an amount of change in transmission power.

$$0 < Ps - Pn + D < TH1 \tag{1}$$

In the example 2 of FIG. 9, a predicted value (Qs') of RSRQ of the objective cell (pico cell 62) assuming the transmission power is changed is calculated, and total number of measurement report samples where Qs' is equal to or less than a specified threshold TH2 is used as the predicted value of the number of cell-edge UEs. The definition of RSRQ is specified in the 3GPP technical specification, 3GPP TS 36.214 V9.2.0 (2010-06), and represented by the following expression (2).

$$RSRQ = N \times RSRP/(\text{E-UTRA carrier RSSI}) \tag{2}$$

In the expression (2), N indicates the number of resource blocks in measurement band of E-UTRA carrier Received Signal Strength Indicator (RSSI). E-UTRA carrier RSSI is total received power in measurement band with N number of resource blocks. The simplest way to calculate the predicted value (Qs') of RSRQ is to perform calculation on the assumption that E-UTRA carrier RSSI in the denominator of the expression (2) and RSRP in the numerator of the expression (2) change by the value corresponding to the amount of change D[dB] in the transmission power of the pico BS 4. Another way is to predict a change in traffic load on the pico cell 62 and the macro cell 61 which is caused by a change in the transmission power of the pico BS 4 and reflect the result on calculation of RSSI after assuming the transmission power of the pico BS 4 is changed.

In the example 3 of FIG. 9, a predicted value (Rs') of SINR of the objective cell (pico cell 62) assuming the transmission power is changed is calculated, and total number of measurement report samples where Rs' is equal to or less than a specified threshold TH3 is used as the predicted value of the number of cell-edge UEs. The simplest way to calculate the predicted value (Rs') of SINR is to perform calculation on the assumption that received power of a radio signal from the pico cell 62 changes by the value corresponding to the amount of change D[dB] in the transmission power of the pico BS 4.

In the example 4 of FIG. 9, total number of measurement report samples that satisfy both of the conditions of the example 1 and the conditions of the example 2 is used as the predicted value of the number of cell-edge UEs. In the example 5 of FIG. 9, total number of measurement report samples that satisfy both of the conditions of the example 1 and the conditions of the example 3 is used as the predicted value of the number of cell-edge UEs.

FIG. 10 shows three examples of calculation conditions for a predicted value of the number of cell-edge UEs on both cell sides (i.e., on the pico cell 62 side and the macro cell 61 side). In the example 6 of FIG. 10, total number of measurement report samples that satisfy the conditions of the following expression (3) is used as the predicted value of the number of cell-edge UEs. By taking the case where a difference in RSRP (i.e., Ps−Pn) is a negative value into consideration, it is possible to estimate the number of cell-edge UEs on both cell sides including the cell edge on the macro cell 61 side.

$$0 < |Ps-Pn+D| < TH1 \quad (3)$$

The example 7 of FIG. 10 corresponds to the example 4 of FIG. 9. Specifically, in the example 7 of FIG. 10, total number of measurement report samples that satisfy both of the conditions for RSRP shown in the example 6 and the conditions for RSRQ as in the example 2 is used as the predicted value of the number of cell-edge UEs. Note that Qn' is the predicted value of RSRQ of the neighboring cell (macro cell 61) after assuming the transmission power of the objective cell (pico cell 62) is changed by the amount of D[dB]. In the case where (Ps−Pn+D) is a positive value, it is predicted that UEs connect to the objective cell (pico cell 62) at the point where the measurement report sample is obtained even after the transmission power of the objective cell (pico cell 62) is changed by the amount of D[dB], and therefore determination is made using the predicted value (Qs') of RSRQ of the objective cell (pico cell 62). On the other hand, in the case where (Ps−Pn+D) is a negative value, it is predicted that UEs connect to the neighboring cell (macro cell 61) at the point where the measurement report sample is obtained after the transmission power of the objective cell (pico cell 62) is changed by the amount of D[dB], and therefore determination is made using the predicted value (Qn') of RSRQ of the neighboring cell (macro cell 61).

The example 8 of FIG. 10 corresponds to the example 5 of FIG. 9. Specifically, in the example 8 of FIG. 10, total number of measurement report samples that satisfy both of the conditions for RSRP shown in the example 6 and the conditions for SINR as in the example 3 is used as the predicted value of the number of cell-edge UEs. Note that Rn' is the predicted value of SINR of the neighboring cell (macro cell 61). In the case where (Ps−Pn+D) is a positive value, it is predicted that UEs connect to the objective cell (pico cell 62) at the point where the measurement report sample is obtained even after the transmission power of the objective cell (pico cell 62) is changed by the amount of D[dB], and therefore determination is made using the predicted value (Rs') of SINR of the objective cell (pico cell 62). On the other hand, in the case where (Ps−Pn+D) is a negative value, it is predicted that UEs connect to the neighboring cell (macro cell 61) at the point where the measurement report sample is obtained after the transmission power of the objective cell (pico cell 62) is changed by the amount of D[dB], and therefore determination is made using the predicted value (Rn') of SINR of the neighboring cell (macro cell 61).

Note that there can be a plurality of neighboring cells depending on the configuration of a network. In such a case, a neighboring cell to be taken into account in the calculation of the number of cell-edge UEs may be selected as follows. For example, for each measurement report, one cell with the highest radio quality (for example, RSRP) among a plurality of neighboring cells may be selected as a neighboring cell to be taken into account in the calculation of the number of cell-edge UEs. Alternatively, one neighboring cell among a plurality of neighboring cells may be selected in advance. For example, (1) a neighboring cell where handover of UE occurs most frequently with the objective cell (pico cell 62), (2) a neighboring cell which is the closest to the objective cell (pico cell 62), or (3) a neighboring cell which is detected most frequently by a plurality of UEs that connect to and communicates with the objective cell (pico cell 62) may be selected in advance.

Second Specific Example

A second specific example of a process of determining a radio parameter updated value by the radio parameter control apparatus 1 is described here. In the second specific example, the radio parameter control apparatus 1 calculates a current value of the number of cell-edge UEs using measurement reports from the pico UE 5, without using measurement reports from the macro UE 3. Then, the radio parameter control apparatus 1 repeatedly calculates "a current value" of the number of cell-edge UEs each time the radio parameter is changed, compares the calculated "current value" with the "past value" of the number of cell-edge UEs (i.e., the number of cell-edge UEs under the previous radio parameter) and thereby determines the value of the radio parameter by which a smaller number of cell-edge UEs is obtained.

Figure 11:
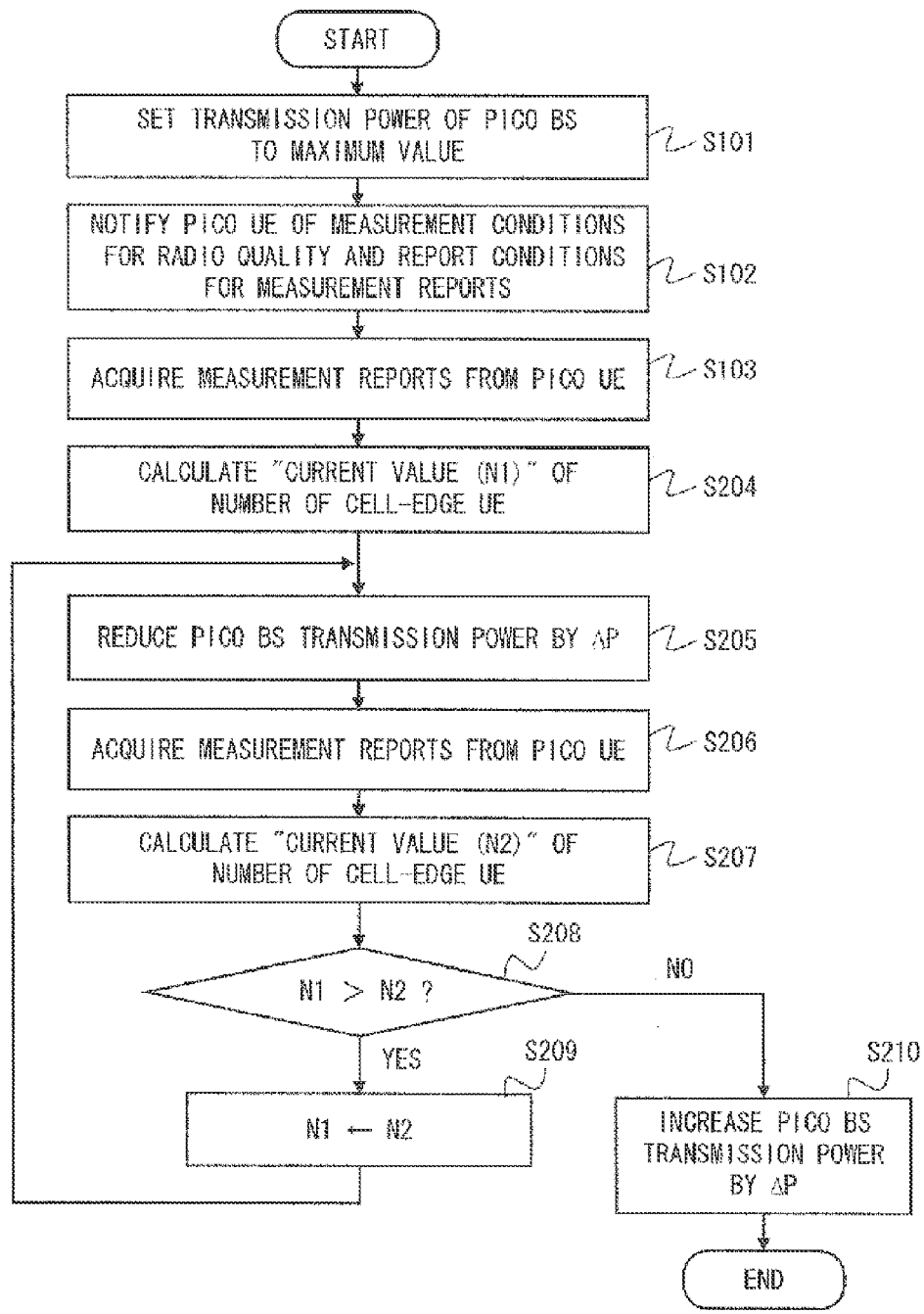
FIG. 11 is a flowchart showing a second specific example of a radio parameter determination process by the radio parameter control apparatus shown in FIG. 1.

FIG. 11 is a flowchart showing the second specific example. Steps S101 to S103 of FIG. 11 are the same as Steps S101 to S103 of FIG. 7. In Step S204, the radio parameter determination unit 11 calculates a current value (N1) of the number of cell-edge UEs using a plurality of measurement reports. The current value of the number of cell-edge UEs may be calculated by any of the methods described with reference to FIGS. 8A, 8B, 8C, 9 and 10. When calculating the current value of the number of cell-edge UEs using any of the examples 1 to 8 in FIGS. 9 and 10, the amount of change in transmission power D may be set to zero. The radio parameter determination unit 11 holds the calculated value N1 as the past value to be compared with the updated value (N2) of the transmission power of the pico BS 4.

In Step S205, the radio parameter determination unit 11 reduces the transmission power of the pico BS 4 by ΔP. In other words, the radio parameter determination unit 11 determines a value obtained by subtracting ΔP from the current value of the transmission power of the pico BS 4 as the updated value of the transmission power of the pico BS 4. In Step S206, the measurement report collection unit 10 acquires a plurality of measurement reports generated by the pico UE 5 after reducing the transmission power of the pico BS 4 by ΔP is made. In Step S204, the radio parameter determination unit 11 calculates a current value (N2) of the number of cell-edge UEs using a plurality of measurement reports.

In Step S208, the radio parameter determination unit 11 compares the current value (N2) of the number of cell-edge UEs with the past value (N1). When the current value (N2) of the number of cell-edge UEs is smaller than the past value (N2), the radio parameter determination unit 11 holds the current value (N2) as the new past value (N1) and repeats the process after Step S205 (Step S209). On the other hand, when the current value (N2) of the number of cell-edge UEs is equal to or larger than the past value (N2), the radio parameter determination unit 11 increases the transmission power of the pico BS 4 by ΔP and ends the process (Step S210).

Although the initial value of the transmission power is set to the maximum value in Step S101 of FIG. 11, any transmission power different from the maximum value may be set as the initial value. Further, the procedure of FIG. 11 may be altered to calculate the transmission power that gives the minimum number of cell-edge UEs using a known local search algorithm such as a hill climbing method or a simulated annealing method.

The second specific example calculates the optimum solution of the radio parameter (the transmission power of the pico BS 4) using a trial-and-error algorithm by actually changing the coverage of the pico cell 62 (i.e., by actually changing the transmission power of the pico BS 4), instead of predicting the number of cell-edge UEs assuming the radio parameter is changed. In the case of using a local search algorithm, there is a possibility that the smallest value cannot be obtained due to convergence on a local minimum value, which a problem of the algorithm. However, because the algorithm uses only the number of cell-edge users under the current radio parameter and there is no need to predict variation of radio quality with a change in radio parameter, there is also a possibility that the more suitable solution than the first specific example can be obtained. Note that, without using the local search algorithm, the transmission power value that gives the smallest number of cell-edge UEs may be obtained by collecting measurement reports while actually changing the transmission power of the pico BS 4 between the highest value and the lowest value.

The above-described first specific example and second specific example may be combined. For example, after calculating the updated value of the transmission power according to the first specific example, fine adjustment may be made to the transmission power according to the second specific example. By combining the first specific example and the second specific example, a more suitable updated value of the radio parameter (which allows more reduction of the number of cell-edge UEs) can be obtained.

Third Specific Example

The first and second specific examples describe examples in which the number of cell-edge UEs between the macro cell 61 and the pico cell 62 is calculated using measurement reports from the pico UE 5 without using measurement reports from the macro UE 3. The third specific example describes an example in which the number of cell-edge UEs between the macro cell 61 and the pico cell 62 is calculated using measurement reports from both the pico UE 5 and the macro UE 3.

Figure 12:
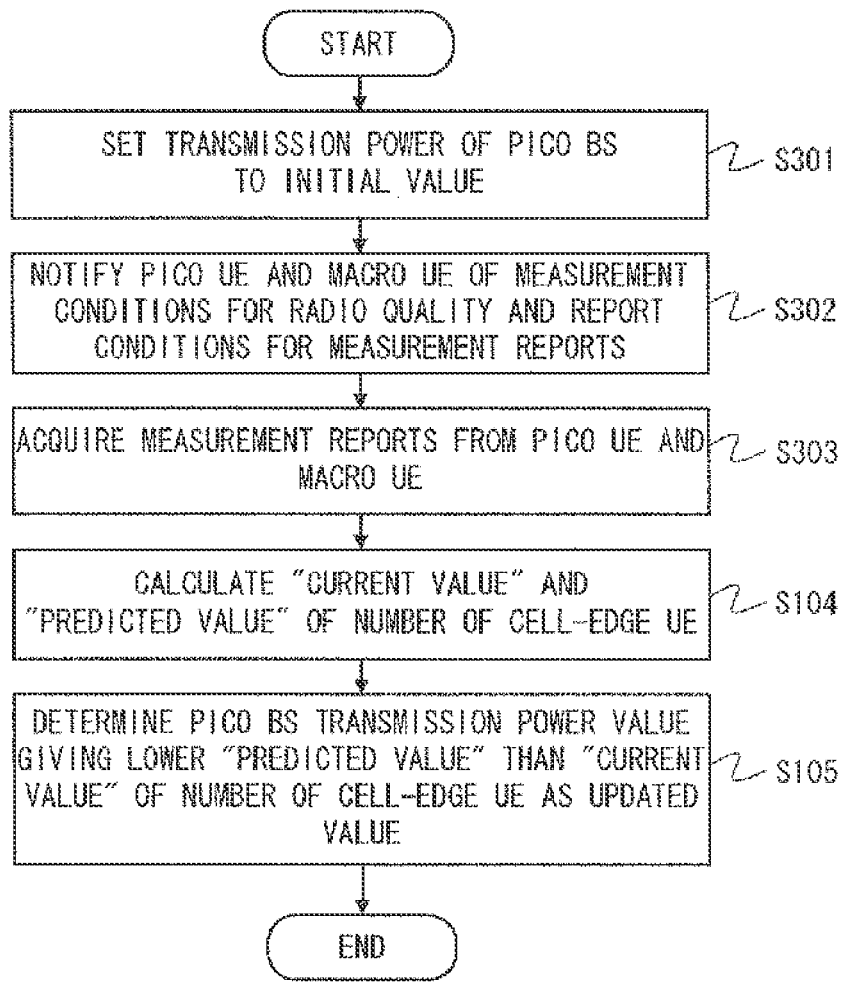
FIG. 12 is a flowchart showing a third specific example of a radio parameter determination process by the radio parameter control apparatus shown in FIG. 1.

FIG. 12 is a flowchart showing the third specific example. In Step S301, the radio parameter determination unit 11 sets transmission power of the pico BS 4 to an initial value. The initial value may be any value within an allowable range of the transmission power of the pico BS 4. In Step S302, the measurement report collection unit 10 notifies both the pico UE 5 and the macro UE 3 of measurement conditions for radio quality and report conditions for measurement reports. The notification to the macro UE 3 may be made using a radio signal transmitted from the pico BS 4. Further, the notification to the macro UE 3 may be made via the macro BS 2. In this case, the notification to the macro UE 3 may be supplied to the macro BS 2 using a control interface available between the radio parameter control apparatus 1 and the macro BS 2. For example, in the case where the radio parameter control apparatus 1 is located in the pico BS 4, a control interface (e.g., LTE X2 interface) between base stations may be used, or a control interface (e.g., UMTS Iub interface) with an upper apparatus (e.g., RNC) may be used.

In Step S303, the measurement report collection unit 10 acquires a plurality of measurement reports generated by the pico UE 5 and the macro UE 3. In the case where the radio parameter control apparatus 1 is located in the pico BS 4, the pico BS 4 may acquire the measurement reports from the macro UE 3 by the following methods. As a first method, the macro UE 3 reports, to the pico BS 4, a measurement report containing radio quality of the pico cell 62 measured by the macro UE 3 during connection to the macro cell 61, at the time when the macro UE 3 connects to the pico cell 62 by handover/cell reselection. As a second method, the pico BS 4 receives a measurement report transmitted from the macro UE 3 to the macro BS 2 from the macro BS 2 by using a control interface between base stations (e.g., LTE X2 interface)

Steps S104 and S105 of FIG. 12 are the same as Steps S104 and S105 shown in FIG. 7 except that the measurement report samples from not only the pico UE 5 but also the macro UE 3 are used for the calculation of the number of cell-edge UEs between the macro cell 61 and the pico cell 62. The calculation of the current value and the predicted value of the number of cell-edge UEs in Step S104 of FIG. 12 may be performed using any of the specific examples described with reference to FIGS. 8A, 8B, 8C, 9 and 10. Further, the calculation of the current value and the predicted value of the number of cell-edge UEs may be performed by the following method, instead of those specific examples.

Figure 13:
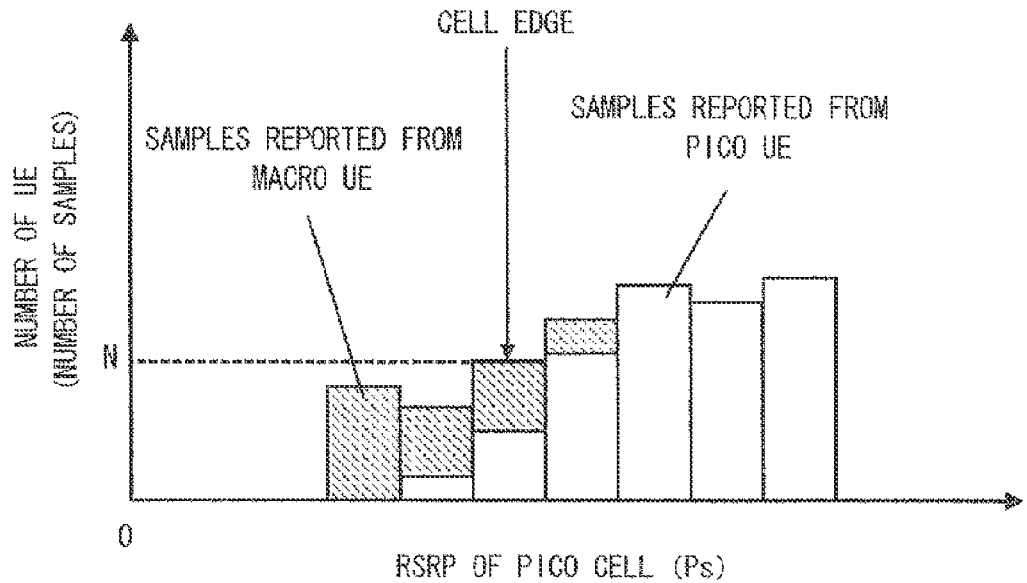
FIG. 13 is a histogram showing a relationship between the number of samples of measurement reports from mobile stations and pico cell received power.

FIG. 13 is a histogram showing a distribution of measurement report samples from the pico UE 5 and the macro UE 3. The horizontal axis of FIG. 13 indicates RSRP (Ps) of the pico cell. When the number of UEs is sufficiently large and a sufficient number of measurement report samples are obtained, it is considered that the number of measurement report samples from the pico UE 5 and the number of measurement report samples from the macro UE 3 are close to each other at the cell edge between the pico cell 62 and the macro cell 61. Accordingly, as shown in FIG. 13, in a distribution of radio quality (i.e., the RSRP of the pico cell in the example of FIG. 13) which is compiled using the measurement reports, a point at which the number of measurement report samples from the pico UE 5 and the number of measurement report samples from the macro UE 3 are the closest may be regarded as the cell edge. Then, the total number of measurement report samples at the cell edge may be used as the "current value" of the number of cell-edge UEs.

Further, in order to obtain the predicted value of the number of cell-edge UEs, a change of serving cells for the pico UE 5 and the macro UE 3 in the case where it is assumed that the transmission power of the pico BS 4 is changed may be predicted for each of measurement report samples based on conditions for handover/cell reselection of UEs. For example, RSRP of the pico cell when it is assumed that the transmission power of the pico BS 4 is changed is predicted for each of the measurement report samples, and the measurement report sample is assumed to be obtained from the pico UE when the RSRP of the pico cell is higher than the RSRP of the macro cell. Then, using the prediction result of the measurement report samples from the pico UE 5 and the macro UE 3 when it is assumed that a change of serving cells is made, a point at which the number of measurement report samples from the pico UE 5 and the number of measurement report samples from the macro UE 3 are the closest is determined as the cell edge, and the total number of measurement report samples at the cell edge is calculated as the "predicted value" of the number of cell-edge UEs.

According to the third specific example, UEs, among a plurality of macro UEs 3, that are located at the cell edge between the macro cell 61 and the pico cell 62 can be taken into consideration, and it is thus possible to more accurately estimate the number of cell-edge UEs. Note that the flowchart of FIG. 12 is shown as a modification of the first specific example (FIG. 7) that calculates the predicted value of the number of cell-edge UEs. However, using the measurement reports from the macro UE 3 in addition to the measurement reports from the pico UE 5 may be applied to the trial-and-error control described in the second specific example.

Second Embodiment

In this embodiment, an alternative example of the above-described first embodiment is described. Specifically, a radio parameter control apparatus 7 according to this embodiment determines the updated value of a radio parameter in the same manner as in the above-described radio parameter control apparatus 1, but further using traffic load of a cell. As the traffic load of a cell, usage rate of LTE resource blocks, ratio of usage power to the maximum uplink or downlink transmission power, the number of communications within a specified time period or the like may be used, for example.

Figure 14:
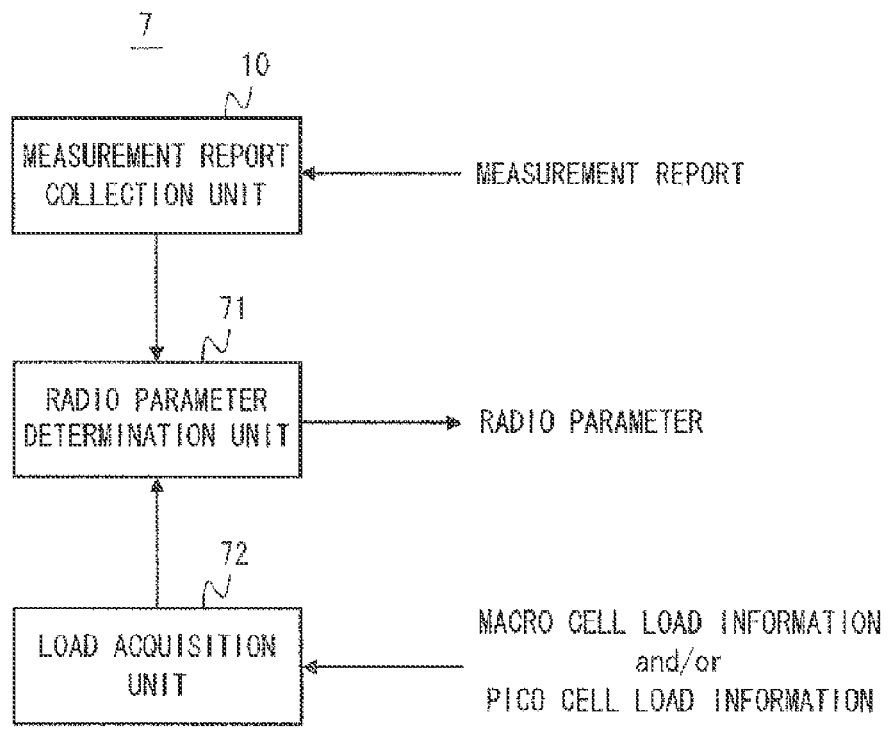
FIG. 14 is a bock diagram showing a configuration example of a pico base station according to a second embodiment of the invention.

FIG. 14 is a bock diagram showing a configuration example of the radio parameter control apparatus 7. Note that a network configuration example including the radio parameter control apparatus 7 is the same as in FIGS. 1 to 4. The functions and operation of the measurement report collection unit 10 in FIG. 14 are the same as those of the elements with the corresponding symbols shown in FIG. 5. A load acquisition unit 72 acquires traffic load information of a neighboring cell (macro cell 61), traffic load information of the objective cell (pico cell 62), or load information of the both cells. The load acquisition unit 72 may acquire the cell load information from a base station that manages a cell through an upper network or may acquire the cell load information using a control interface between base stations.

A radio parameter determination unit 71 takes the traffic load of a cell into consideration at the time of determining the updated value of a radio parameter so as to reduce the current value of the number of cell-edge UEs. For example, when the traffic load of the neighboring cell (macro cell 61) is heavy, reducing the coverage of the objective cell (pico cell 62) would cause a traffic congestion of the neighboring cell. To avoid this, as an example, the radio parameter determination unit 71 may perform radio parameter adjustment that reduces the coverage of the objective cell (pico cell 62) on condition that the traffic load of the neighboring cell (macro cell 61) is low.

Figure 15:
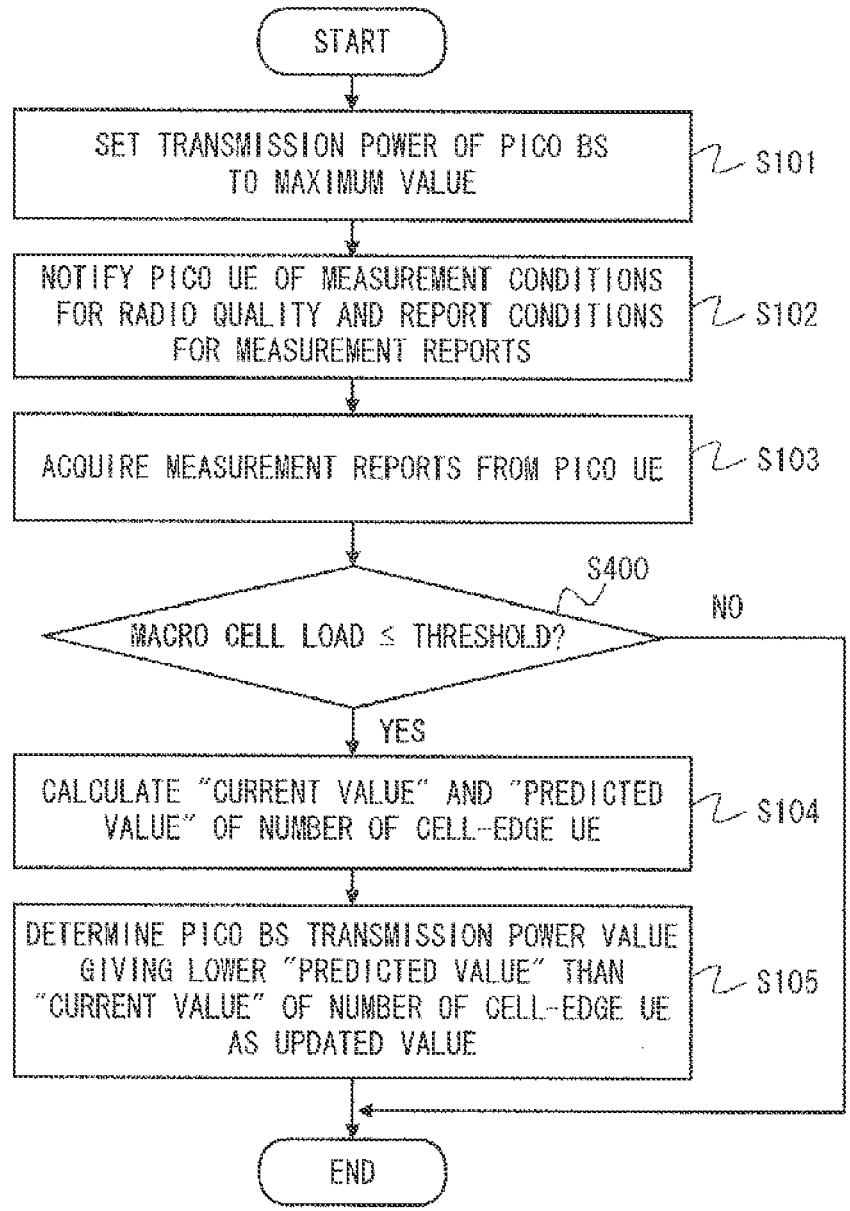
FIG. 15 is a flowchart showing a first specific example of a radio parameter determination process by the radio parameter control apparatus shown in FIG. 14.

FIG. 15 is a flowchart showing a modification of a process of determining the updated value of a radio parameter shown in FIG. 7. In the example of FIG. 15, Step S400 is added. In Step S400, it is determined whether the traffic load of the neighboring macro cell 61 is a specified threshold or less. Then, on condition that the traffic load of the neighboring macro cell 61 is a specified threshold or less (YES in Step S400), the updated value of the transmission power of the pico BS 4, which has a possibility of reducing the coverage of the pico cell 62, is determined (Steps S104 and S105).

As another example, the radio parameter determination unit 71 may change the coverage of the pico cell 62 when the traffic load of the objective cell (pico cell 62) is a specified threshold or less. As yet another example, the radio parameter determination unit 71 may use both of the traffic load of the objective cell (pico cell 62) and the traffic load of the neighboring cell (macro cell 61). For example, the radio parameter determination unit 71 may change the coverage of the pico cell 62 when the sum of the traffic load of the pico cell 62 and the traffic load of the macro cell 61 is a specified threshold or less.

Figure 16:
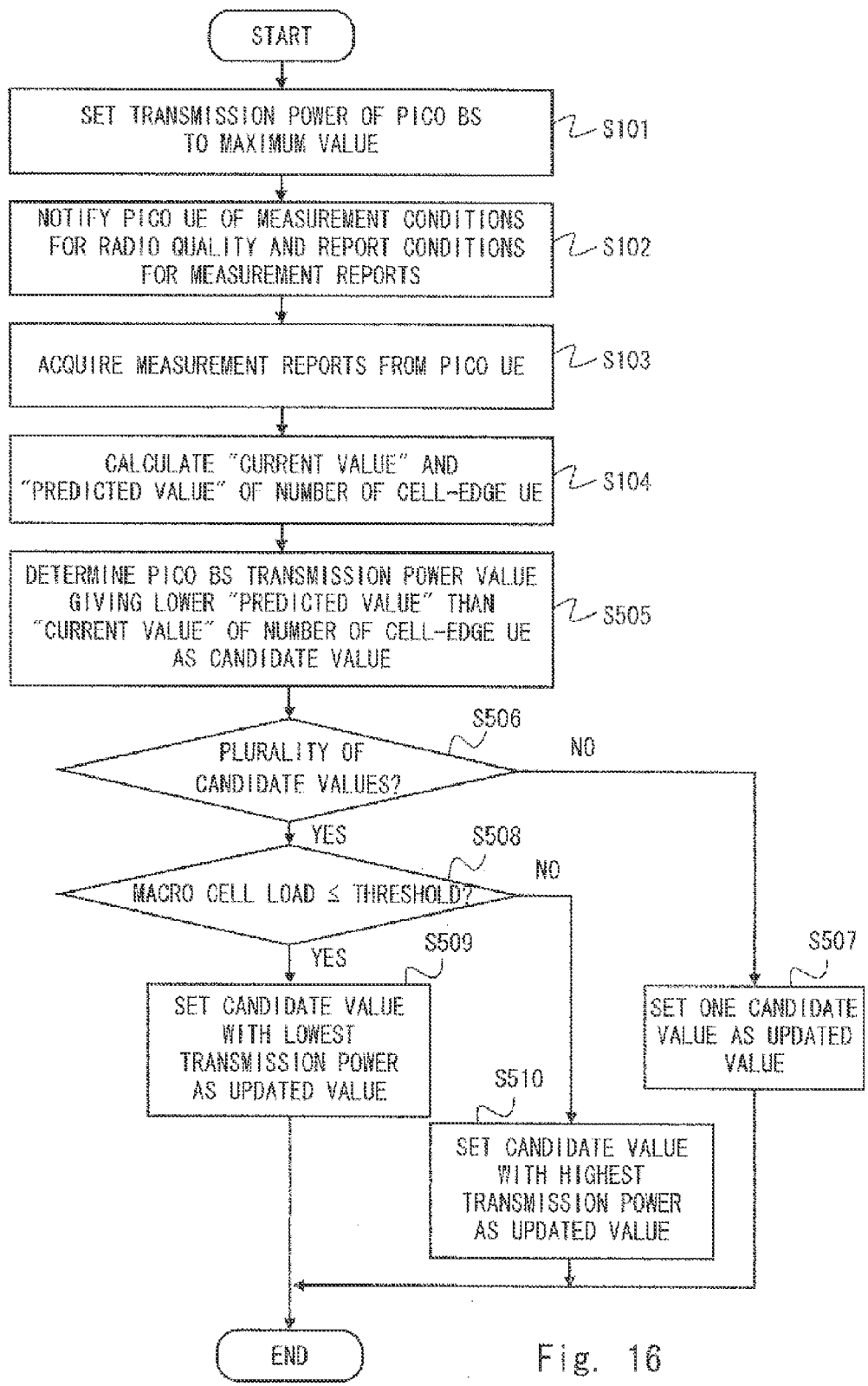
FIG. 16 is a flowchart showing a second specific example of a radio parameter determination process by the radio parameter control apparatus shown in FIG. 14.

Further, when there are a plurality of candidates for the updated value of a radio parameter that can reduce the number of cell-edge UEs, the radio parameter determination unit 71 may select one candidate from the plurality of candidates in consideration of traffic load of a cell. FIG. 16 is a flowchart showing a specific example of a process of selecting one candidate from a plurality of candidates in consideration of traffic load of a cell. Steps S101 to S104 of FIG. 16 are the same as Steps S101 to S104 shown in FIG. 7.

Figure 17:
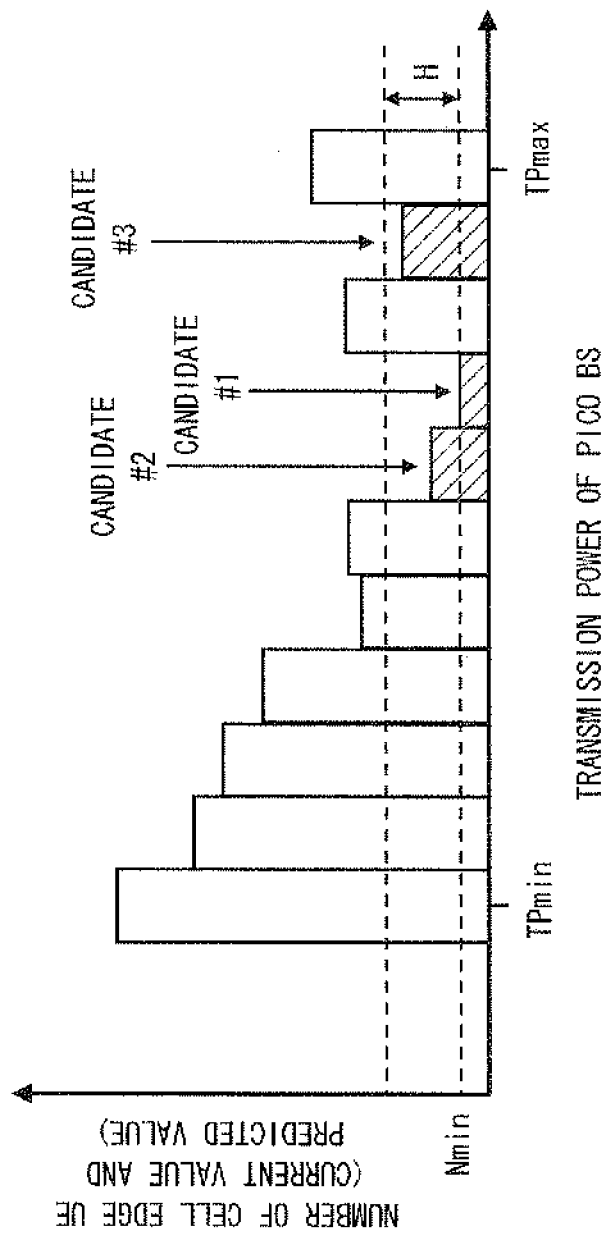
FIG. 17 is a histogram showing an example of a current value and predicted values of the number of cell-edge UEs.

In Step S505, the radio parameter determination unit 71 selects a transmission power value of the pico BS 4 that gives a predicted value of the number of cell-edge UEs which is smaller than the current value of the number of cell-edge UEs as a candidate value. For example, the radio parameter determination unit 71 may select a candidate value (candidate #1) that gives the minimum value Nmin among the current value and the predicted values of the number of cell-edge UEs and other candidate values (candidates #2 and #3) where a difference from the minimum value is within a specified value H as shown in FIG. 17.

When the number of candidate values selected in Step S505 is one (NO in Step S506), the radio parameter determination unit 71 can determine the one candidate value as the updated value of a radio parameter (Step S507). On the other hand, when a plurality of candidate values are selected in Step S505 (YES in Step S506), the radio parameter determination unit 71 determines whether the traffic load of the neighboring cell (macro cell 61) is a specified threshold or less (Step S508). When the traffic load of the macro cell 61 is a specified threshold or less (YES in Step S508), the radio parameter determination unit 71 determines, as the updated value, the candidate value where the transmission power of the pico BS 4 is the lowest (i.e., the candidate value by which the coverage of the pico cell 62 is the smallest) among the plurality of candidate values (Step S509). On the other hand, when the traffic load of the macro cell 61 exceeds the threshold (NO in Step S508), the radio parameter determination unit 71 determines, as the updated value, the candidate value where the transmission power of the pico BS 4 is the highest (i.e., the candidate value by which the coverage of the pico cell 62 is the largest) among the plurality of candidate values (Step S509).

The procedure of FIG. 16 can prevents reducing the coverage of an objective cell when the traffic load of a neighboring cell is heavy. It is thereby possible to avoid the occurrence of traffic congestion of the neighboring cell.

Yet another way of using the traffic load of a cell is described hereinbelow. When estimating the number of cell-edge UEs using measurement reports from the UE, the radio parameter determination unit 71 may use only measurement reports (measurement results) measured during the time period when traffic load of the objective cell (pico cell 62) satisfies specified conditions. For example, the radio parameter determination unit 71 may analyze the distribution of radio quality using only the measurement results during the time period when the traffic load of the pico cell 62 is relatively high and thereby estimate the number of cell-edge UEs and determine the updated value of the radio parameter. It is thereby possible to make coverage design that is suitable for the traffic peak time.

Other Embodiments

In the first and second embodiments, the case of adjusting the transmission power of a base station, which is a specific example of a radio parameter which can change the cell coverage, is described in detail. However, as described earlier, the radio parameter may be a tilt angle of an antenna of a base station or CIO. In the case of adjusting the antenna tile angle, it is preferred that the amount of variation of radio quality in accordance with a change in tilt angle is defined as a statistical model in advance. It is thereby possible to handle the adjustment of the antenna tilt angle in the same manner as the adjustment of the transmission power described above.

In the first and second embodiments, a lower limit may be set to the transmission power of a base station that manages an objective cell, and the radio parameter determination unit 11 may adjust the transmission power within the range which does not fall below the lower limit. For example, the lower limit of the transmission power may be set to the transmission power value that is needed to avoid a coverage hole. Alternatively, the lower limit of the transmission power may be set to the transmission power value that is needed to obtain the minimum user throughput required in the objective cell.

UE distribution in a cell often varies depending on time. Therefore, in the first and second embodiments, the radio parameter control apparatuses 1 and 7 may sort and count a plurality of measurement reports based on time periods when the radio quality is measured and may determine a different updated value of the radio parameter for each time period. It is thereby possible to determine the radio parameter (i.e., the cell coverage) suitable for each time period and effectively reduce the number of cell-edge UEs. For example, the sorting may be made between a daytime period and a night-time period. In this case, when determining the radio parameter suitable for the daytime period, the number of cell-edge UEs is calculated based on the distribution of measurement results of radio quality measured in the daytime, and the radio parameter is thereby determined.

Instead of counting the number of measurement reports satisfying conditions for the cell-edge UE by the radio parameter control apparatuses 1 and 7, each UE may report only the measurement information satisfying the conditions. For example, consider the case where the number of cell-edge UEs is counted under the condition of $0<Ps-Pn<TH1$ in the trial-and-error control described as the second specific example in the embodiment. In this case, instead of counting the number of samples of measurement reports satisfying the conditions, the radio parameter control apparatus 1 may instruct UEs to send only the measurement report satisfying the above conditions.

In the first and second embodiments, the hierarchical cell environment (heterogeneous network environment) of the macro cell 61 and the pico cell 62 is described specifically. However, the first and second embodiments may be applied also to another hierarchical cell environment of a macro cell and a micro cell, a macro cell and a femto cell, a micro cell and a femto cell and the like, for example. Further, the first and second embodiments may be applied also to the environment in which adjacent cells have partial overlap, not the strict hierarchical cell environment in which a cell with a small coverage is totally covered by a cell with a large coverage. Furthermore, the first and second embodiments may be applied also to the environment in which cells with substantially the same size of coverage (e.g., macro cells) are located adjacent to each other. The first and second embodiments can contribute to reduction of the number of cell-edge UEs in those cell environments as well.

The radio parameter update process by the radio parameter control apparatuses 1 and 7 described in the first and second embodiments may be implemented using a semiconductor processing device such as ASIC (Application Specific Integrated Circuit) or DSP (Digital Signal Processor). Further, the radio parameter update process by the radio parameter control devices 1 and 7 may be implemented by causing a computer such as a microprocessor to execute a program. Specifically, a program containing a set of instructions that cause a computer to execute the algorithm shown in any of FIGS. 7, 11, 12, 15 and 16 may be created, and the program may be supplied to the computer.

The program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

Moreover, the present invention is not limited only to the embodiments described above, but can be modified in various manners without departing from the gist of the present invention described above.

This application is based upon and claims the benefit of priority from Japanese patent application No. 2010-281430, filed on Dec. 17, 2010, the disclosure of which is incorporated herein in its entirety by reference.

REFERENCE SIGNS LIST

1 RADIO PARAMETER CONTROL APPARATUS
2 MACRO BASE STATION (MACRO BS)
3 MACRO MOBILE STATION (MACRO UE)
4 PICO BASE STATION (PICO BS)
5 PICO MOBILE STATION (PICO UE)
7 RADIO PARAMETER CONTROL APPARATUS

10 MEASUREMENT REPORT COLLECTION UNIT
11 RADIO PARAMETER DETERMINATION UNIT
40 RADIO COMMUNICATION UNIT
41 COMMUNICATION UNIT
61 MACRO CELL
62 PICO CELL
71 RADIO PARAMETER DETERMINATION UNIT
72 LOAD ACQUISITION UNIT
150 CORE NETWORK
151 RNC (RADIO NETWORK CONTROLLER)
152 MANAGEMENT SERVER

The invention claimed is:

1. A radio parameter control apparatus comprising:
a measurement report collection unit configured to collect a plurality of measurement reports generated by at least one mobile station, each of the measurement reports containing a measurement result of radio quality of a first cell managed by a base station; and
a radio parameter determination unit configured to calculate a current value of a number of cell-edge mobile stations deemed to be located at a cell edge between the first cell and a neighboring cell, to calculate a predicted value of the number of cell-edge mobile stations by assuming that a radio parameter capable of changing coverage of the first cell is changed, and to determine, as an updated value of the radio parameter, a radio parameter giving a smaller predicted value than the current value.

2. The radio parameter control apparatus according to claim 1, wherein the radio parameter determination unit determines as the updated value a radio parameter giving the smallest predicted value by assuming that the radio parameter is changed.

3. The radio parameter control apparatus according to claim 1, wherein the radio parameter determination unit determines the updated value so that, in a distribution of samples of radio quality of the first cell compiled using the plurality of measurement reports, a position where the number of samples of radio quality of the first cell is smaller than the current value becomes the cell edge.

4. The radio parameter control apparatus according to claim 1, wherein the radio parameter determination unit identifies mobile stations from which the plurality of measurement reports have been transmitted when calculating the number of cell-edge mobile stations, and thereby excludes overlap count of measurement report samples generated by the same mobile station.

5. The radio parameter control apparatus according to claim 1, wherein each of the plurality of measurement reports further contains a measurement result of radio quality of the neighboring cell.

6. The radio parameter control apparatus according to claim 5, wherein
the cell edge includes a first cell edge on the first cell side and a second cell edge on the neighboring cell side, and
the radio parameter determination unit determines the updated value so as to reduce the number of cell-edge mobile stations located at the first and second cell edges.

7. The radio parameter control apparatus according to claim 1, wherein the radio parameter determination unit determines, based on a measurement time of radio quality of the first cell, an updated value for each of a plurality of time periods.

8. The radio parameter control apparatus according to claim 1, further comprising:
load acquisition unit configured to acquire load information indicating a traffic load of at least one of the first cell and the neighboring cell,
wherein the radio parameter determination unit determines the updated value by further using the load information.

9. The radio parameter control apparatus according to claim 8, wherein the radio parameter determination unit updates the radio parameter on condition that the traffic load of the neighboring cell is lower than a reference.

10. The radio parameter control apparatus according to claim 8, wherein the radio parameter determination unit updates the radio parameter on condition that the traffic load of the first cell is lower than a reference.

11. The radio parameter control apparatus according to claim 8, wherein the radio parameter determination unit updates the radio parameter on condition that a sum of the traffic loads of the first cell and the neighboring cell is lower than a reference.

12. The radio parameter control apparatus according to claim 8, wherein, when there are a plurality of candidates for the radio parameter capable of reducing the number of cell-edge UEs, the radio parameter determination unit selects one candidate from the plurality of candidates in consideration of the traffic load of at least one of the first cell and the neighboring cell.

13. The radio parameter control apparatus according to claim 12, wherein
when the traffic load of the neighboring cell is higher than a reference, the radio parameter determination unit selects as the updated value a candidate causing a coverage of the first cell to be largest from the plurality of candidates for the radio parameter capable of reducing the number of cell-edge mobile stations, and
when the traffic load of the neighboring cell is lower than a reference, the radio parameter determination unit selects as the updated value a candidate causing a coverage of the first cell to be smallest from the plurality of candidates.

14. The radio parameter control apparatus according to claim 1, wherein the plurality of measurement reports include a measurement report generated by a mobile station connected to the first cell and a measurement report generated by a mobile station connected to the neighboring cell.

15. The radio parameter control apparatus according to claim 1, wherein the radio parameter includes at least one of downlink transmission power of the base station, a tilt angle of an antenna of the base station, and a cell individual offset.

16. The radio parameter control apparatus according to claim 1, wherein the radio quality includes at least one of received power (CPICH RSCP: Received Signal Code Power) of a common pilot channel (CPICH: Common Pilot Channel), received quality (CPICH Ec/No) of a common pilot channel, received power (RSRP: Reference Signal Received Power) of a downlink reference signal, and received quality (RSRQ: Reference Signal Received Quality) of a downlink reference signal.

17. The radio parameter control apparatus according to claim 1, wherein the first cell and the neighboring cell form a hierarchical cell structure where the first cell is located within the neighboring cell.

18. A radio parameter control apparatus comprising:
a measurement report collection unit configured to collect a plurality of measurement reports generated by at least one mobile station, each of the measurement reports containing a measurement result of radio quality of a first cell managed by a base station; and a radio parameter determination unit configured to calculate a current value of a number of cell-edge mobile stations deemed to be located at a cell edge between the first cell and a neighboring cell, to compare a past value and the current value of the number of cell-edge mobile stations, and to determine an updated value of a radio parameter capable of changing coverage of the first cell by changing a current value of the radio parameter in a direction to reduce the number of cell-edge mobile stations.

19. A radio parameter control apparatus comprising:
a measurement report collection unit configured to collect a plurality of measurement reports generated by at least one mobile station, each of the measurement reports containing a measurement result of radio quality of a first cell managed by a base station; and
a radio parameter determination unit configured to determine, based on the plurality of measurement reports so as to reduce a number of cell-edge mobile stations deemed to be located at a cell edge between the first cell and a neighboring cell, an updated value of a radio parameter capable of changing coverage of the first cell, wherein
each of the plurality of measurement reports further contains a measurement result of radio quality of the neighboring cell, the number of cell-edge mobile stations is determined using a difference between radio quality of the first cell and radio quality of the neighboring cell.

20. A base station apparatus comprising:
a radio parameter control apparatus including:
　a measurement report collection unit configured to collect a plurality of measurement reports generated by at least one mobile station, each of the measurement reports containing a measurement result of radio quality of a first cell managed by a base station; and
　a radio parameter determination unit configured to calculate a current value of a number of cell-edge mobile stations deemed to be located at a cell edge between the first cell and a neighboring cell, to calculate a predicted value of the number of cell-edge mobile stations by assuming that a radio parameter capable of changing coverage of the first cell is changed, and to determine, as an updated value of the radio parameter, a radio parameter giving a smaller predicted value than the current value; and
radio communication unit configured to communicate with a mobile station and to be controlled based on the updated value.

21. A radio parameter control method comprising:
collecting a plurality of measurement reports generated by at least one mobile station, each of the measurement reports containing a measurement result of radio quality of a first cell managed by a base station;
calculating a current value of a number of cell-edge mobile stations deemed to be located at a cell edge between the first cell and a neighboring cell,
calculating a predicted value of the number of cell-edge mobile stations by assuming that a radio parameter capable of changing coverage of the first cell is changed, and
determining, as an updated value of the radio parameter, a radio parameter giving a smaller predicted value than the current value.

22. A non-transitory computer readable medium storing a program causing a computer to perform a radio parameter control method, the radio parameter control method comprising:
collecting a plurality of measurement reports generated by at least one mobile station, each of the measurement reports containing a measurement result of radio quality of a first cell managed by a base station;
calculating a current value of a number of cell-edge mobile stations deemed to be located at a cell edge between the first cell and a neighboring cell,
calculating a predicted value of the number of cell-edge mobile stations by assuming that a radio parameter capable of changing coverage of the first cell is changed, and
determining, as an updated value of the radio parameter, a radio parameter giving a smaller predicted value than the current value.

* * * * *